US012806744B2

(12) United States Patent
Liu

(10) Patent No.: US 12,806,744 B2
(45) Date of Patent: Nov. 24, 2026

(54) SINGLE-DETENT-GROOVE SOCKET AND STRONG-MAGNETIC DETENT-BALL EXTENSION BAR KIT

(71) Applicant: Hui Liu, Pingxiang City (CN)

(72) Inventor: Hui Liu, Pingxiang City (CN)

( * ) Notice: Subject to any disclaimer, the term of this patent is extended or adjusted under 35 U.S.C. 154(b) by 2 days.

(21) Appl. No.: 19/411,347

(22) Filed: Dec. 7, 2025

(65) Prior Publication Data

US 2026/0233365 A1 Aug. 13, 2026

(30) Foreign Application Priority Data

Feb. 11, 2025 (CN) ......................... 202510149416.8

(51) Int. Cl.
*B25B 13/06* (2006.01)
*B25B 23/00* (2006.01)
*B25B 23/12* (2006.01)

(52) U.S. Cl.
CPC ........ *B25B 13/065* (2013.01); *B25B 23/0035* (2013.01); *B25B 23/12* (2013.01)

(58) Field of Classification Search
CPC ..... B25B 23/12; B25B 23/0035; B25B 13/06; B25B 13/065
USPC ......................................................... 81/125.1
See application file for complete search history.

(56) References Cited

U.S. PATENT DOCUMENTS 5,218,891 A * 6/1993 Olson ..................... B25B 13/04 81/177.8
9,981,366 B2 * 5/2018 Todd ....................... B25B 23/12
10,259,107 B2 * 4/2019 Wang .................. B25B 23/0035
10,328,554 B2 * 6/2019 Todd ........................ B25B 23/12
10,864,617 B2 * 12/2020 Clafton ................... B25B 13/48
10,953,519 B2 * 3/2021 Wilson .................. B25B 13/065
11,123,847 B2 * 9/2021 Huang .................... B25B 13/06
11,318,591 B2 * 5/2022 Minor ................. B25B 23/0035
11,325,230 B2 * 5/2022 Chiang ............... B25B 23/0035
11,890,729 B2 * 2/2024 Hsiao .................. B25B 23/0035
12,042,908 B2 * 7/2024 Zhou ................... B25B 23/0035
12,094,652 B2 * 9/2024 Lee ......................... H01F 7/206
12,459,087 B2 * 11/2025 Santamarina ........... B25B 13/06
2010/0116098 A1 * 5/2010 Kuo ...................... B25B 15/001 81/121.1
2014/0209474 A1 * 7/2014 Lin ......................... B23P 15/00 205/121

(Continued)

FOREIGN PATENT DOCUMENTS

DE 202024100916 U1 * 4/2024 ......... B25B 23/0035

*Primary Examiner* — David B. Thomas
(74) *Attorney, Agent, or Firm* — Nicholas Makridakis

(57) ABSTRACT

A single-detent-groove socket and strong-magnetic detent-ball extension bar kit includes a socket body, where both ends of the socket body are provided with two socket openings of the same size, a socket opening hole is formed in each socket opening, the socket opening holes at both ends are through, and a detent groove is formed in the through internal hexagonal socket opening holes; a matching extension bar is disposed in the internal hexagonal socket opening holes, and the extension bar includes a snap-in head cooperating with either of the internal hexagonal socket opening holes, where a side wall of the snap-in head is provided with an elastic detent ball cooperating with the detent groove, and a magnet is disposed on a top of the snap-in head. During use, when one socket opening becomes worn, a user may switch to the other socket opening for continuous operation.

4 Claims, 4 Drawing Sheets

(56) References Cited

U.S. PATENT DOCUMENTS

| | | | | |
|---|---|---|---|---|
| 2014/0311302 | A1 * | 10/2014 | Taguchi | B25B 23/0035 81/125 |
| 2016/0263732 | A1 * | 9/2016 | Lourenco | B25B 23/0035 |
| 2017/0239790 | A1 * | 8/2017 | Todd | B25B 13/06 |
| 2018/0104797 | A1 * | 4/2018 | Todd | B25B 23/0035 |
| 2019/0091840 | A9 * | 3/2019 | Todd | B25B 23/16 |
| 2020/0016728 | A1 * | 1/2020 | Clafton | B25B 13/48 |
| 2021/0291330 | A1 * | 9/2021 | Hsiao | B25B 15/04 |
| 2021/0379739 | A1 * | 12/2021 | Minor | B25B 23/0035 |
| 2023/0062875 | A1 * | 3/2023 | Owen | B25B 13/065 |
| 2023/0121087 | A1 * | 4/2023 | Su | B25B 23/12 81/125 |
| 2023/0390899 | A1 * | 12/2023 | Minor | B25B 13/102 |
| 2023/0398660 | A1 * | 12/2023 | Chu | B25B 13/06 |
| 2024/0082996 | A1 * | 3/2024 | Minor | B25B 15/008 |
| 2024/0342875 | A1 * | 10/2024 | Lin | B25B 23/12 |
| 2025/0073887 | A1 * | 3/2025 | Summers | B25G 1/043 |
| 2025/0214209 | A1 * | 7/2025 | Fu | B25B 23/12 |

* cited by examiner

SINGLE-DETENT-GROOVE SOCKET AND STRONG-MAGNETIC DETENT-BALL EXTENSION BAR KIT

TECHNICAL FIELD

The present disclosure provides a single-detent-groove socket and strong-magnetic detent-ball extension bar kit, and belongs to the technical field of installation tools.

BACKGROUND

A socket is an installation tool mainly used for fitting over an external hexagon screw to tighten or loosen the screw, with features of convenience and ease of use.

A common socket available on the market is generally of an integral magnetic type. During use, an action object (such as a screw) must match a socket opening. When screws of the same size are repeatedly tightened or loosened in the use process, wear of the socket opening may occur over time, and even the socket cannot be further used. As a result, frequent replacement with a new socket is required, resulting in relatively high costs. Moreover, debris trapped in the socket is cleaned away inconveniently, thereby adversely affecting the usability. Based on this, the present disclosure provides a single-detent-groove socket and strong-magnetic detent-ball extension bar kit.

SUMMARY

The technical problems solved by the present disclosure are that frequent replacement with a new socket is required due to wear when screws of the same size are repeatedly tightened and loosened, resulting in relatively high costs, and metal debris attracted in the socket is inconvenient to clean.

To solve these technical problems, the technical solution provided by the present disclosure is as follows: A single-detent-groove socket and strong-magnetic detent-ball extension bar kit includes a socket body, where both ends of the socket body are provided with two socket openings of the same size, a socket opening hole with two regular hexagonal ends is formed in each socket opening, the socket opening holes at both ends are through, a detent groove is formed in the through internal hexagonal socket opening holes and configured to switch between the identical socket openings at both ends; a matching extension bar is disposed in the internal hexagonal socket opening holes, and the extension bar includes a hexagonal shank configured to be mounted into a power tool or a pneumatic tool, a buffer rod disposed on the hexagonal shank, an anti-slip portion disposed on the buffer rod, and a snap-in head disposed on the anti-slip portion and cooperating with either of the internal hexagonal socket opening holes, where a side wall of the snap-in head is provided with an elastic detent ball cooperating with the detent groove and configured to allow the snap-in head to be locked in the socket opening holes, and a magnet is disposed on a top of the snap-in head and configured to attract and hold an external hexagon screw during installation.

Further, an outer surface of the anti-slip portion is provided with anti-slip knurlings configured to provide an anti-slip effect when the extension bar is removed.

Further, the internal hexagonal socket opening holes at both ends are identical in size and are mutually aligned in position, and are used for dual-end switching to achieve dual functions.

Further, outer walls at both ends of the socket body are symmetrically provided with R-grooves, and the R-grooves are coated with paint of the same color.

Further, the hexagonal shank is provided with a concave detent groove configured to provide a locking function when the extension bar is mounted into a power tool or a pneumatic tool.

The present disclosure has the following beneficial effects:

During use, when screws of the same size are repeatedly tightened or loosened, and one socket opening becomes worn, a user may switch to the other socket opening for continuous operation, which eliminates the need for frequent replacement with a new socket; and the operation is simple, costs are effectively saved, and the service life is long. The magnet is capable of attracting metal debris generated during screw tightening, and the debris may be conveniently cleaned away by pulling the extension bar out from the internal hexagonal socket opening holes.

Figure 1:
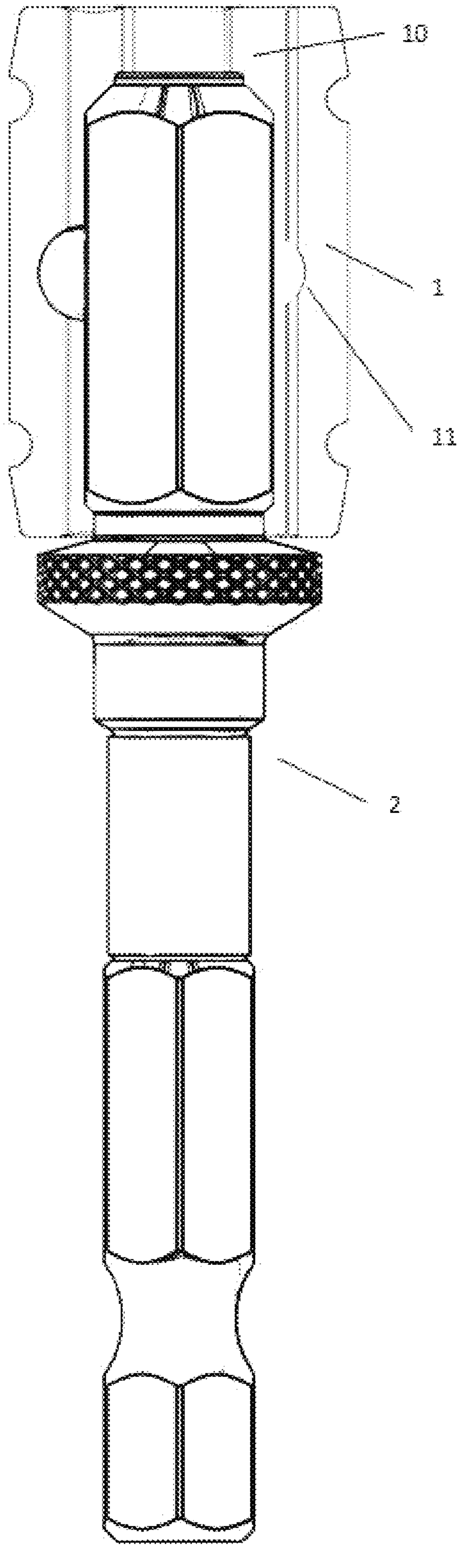
FIG. 1 is an overall schematic plan of a single-detent-groove socket and strong-magnetic detent-ball extension bar kit according to the present disclosure.

Reference numerals in the FIGURES: 1—socket body; 2—extension bar; 10—socket opening hole; 11—detent groove; 12—R-groove; 20—hexagonal shank; 200—concave detent groove; 21—buffer rod; 22—anti-slip portion; 23—snap-in head; 24—elastic detent ball; and 25—magnet.

DETAILED DESCRIPTIONS OF THE EMBODIMENTS

The present disclosure will be further described below in detail in combination with the drawings.

Figure 2:
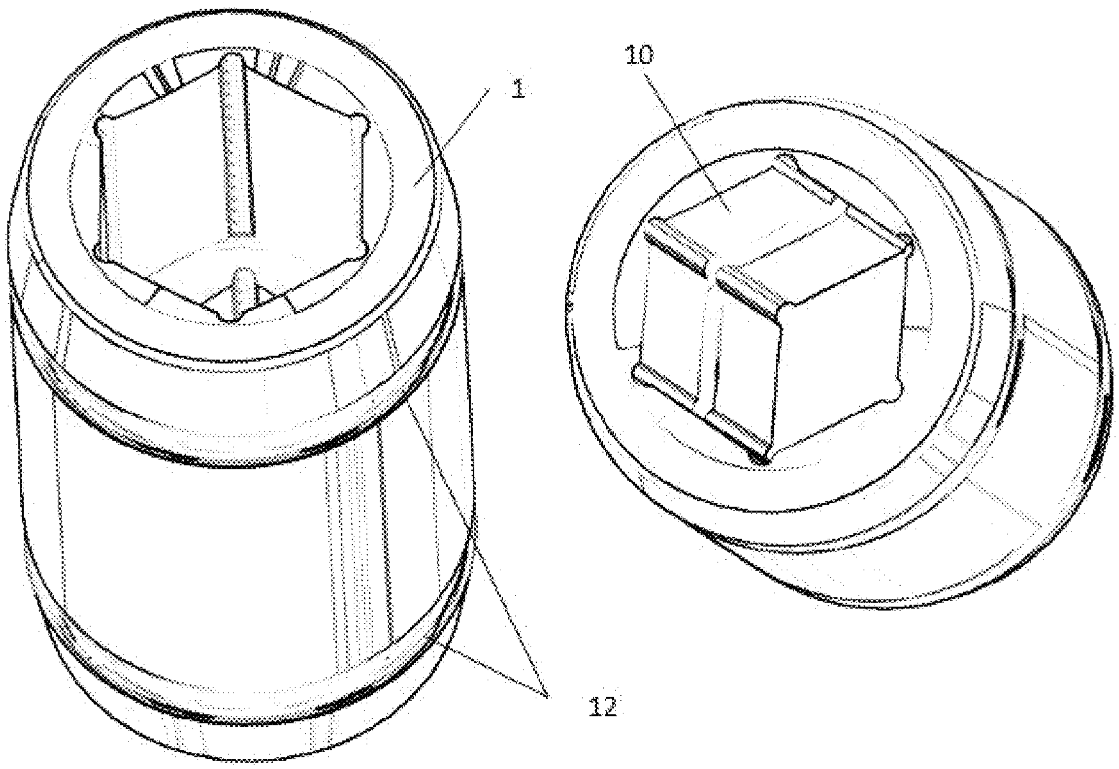
FIG. 2 is a schematic structural view of a socket body of a single-detent-groove socket and strong-magnetic detent-ball extension bar kit according to the present disclosure.
Figure 3:
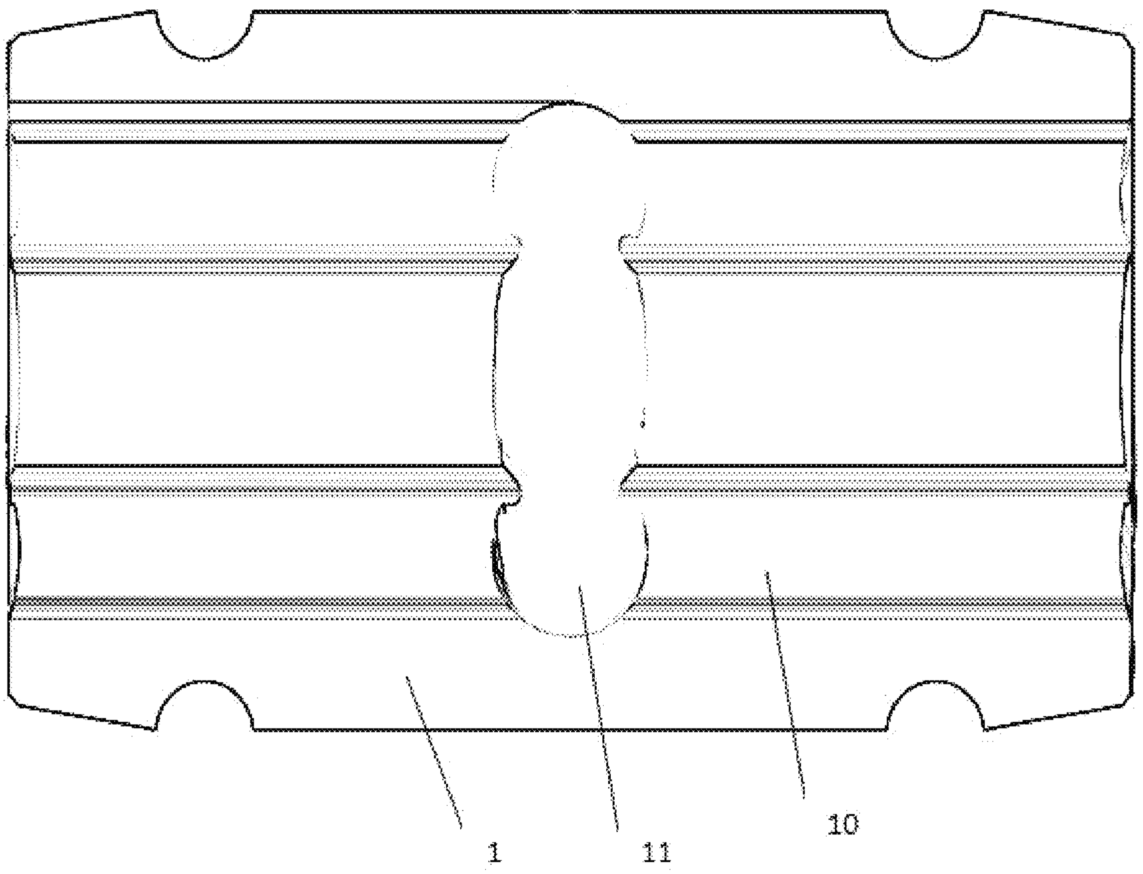
FIG. 3 is a sectional view of a socket body of a single-detent-groove socket and strong-magnetic detent-ball extension bar kit according to the present disclosure.

As shown in FIGS. 1, 2, and 3, the present disclosure provides a single-detent-groove socket and strong-magnetic detent-ball extension bar kit, including a socket body 1, where both ends of the socket body 1 are provided with two socket openings of the same size, a socket opening hole 10 with two regular hexagonal ends is formed in each socket opening, the socket opening holes 10 at both ends are through, and a detent groove 11 is formed in the through internal hexagonal socket opening holes 10; and the internal hexagonal socket opening holes 10 at both ends are identical in size and are mutually aligned in position, and used for dual-end switching to achieve dual functions. When one socket opening becomes worn, a user may switch to the other socket opening for continuous operation, which eliminates the need for frequent replacement with a new socket. Outer walls at both ends of the socket body 1 are symmetrically provided with R-grooves 12, and the R-grooves 12 are coated with paint of the same color configured to mark a dual-end operation.

Figure 4:
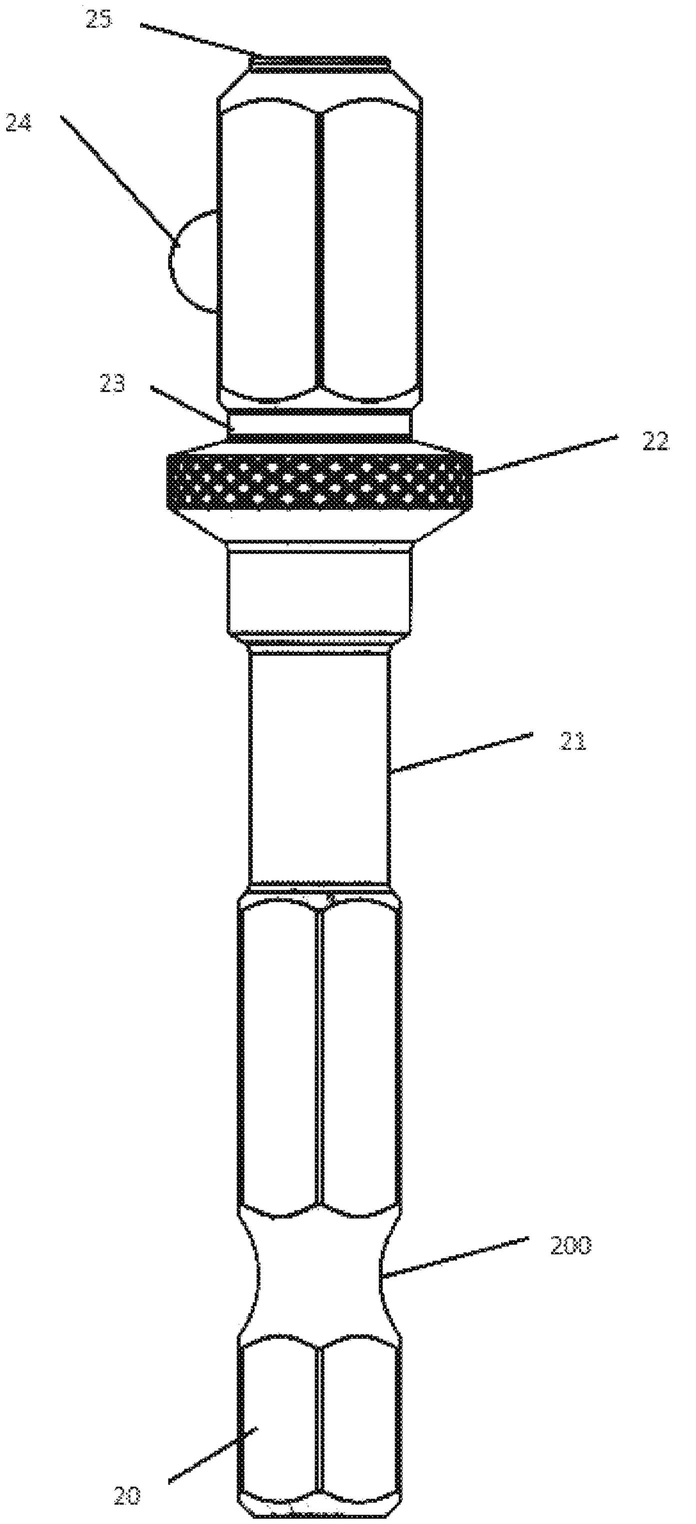
FIG. 4 is a schematic plan of an extension bar of a single-detent-groove socket and strong-magnetic detent-ball extension bar kit according to the present disclosure.

As shown in FIGS. 1 and 4, a matching extension bar 2 is disposed in the internal hexagonal socket opening holes 10, and the extension bar 2 includes a hexagonal shank 20 configured to be mounted into a power tool or a pneumatic tool, a buffer rod 21 disposed on the hexagonal shank 20, an anti-slip portion 22 disposed on the buffer rod 21, and a snap-in head 23 disposed on the anti-slip portion 22 and cooperating with either of the internal hexagonal socket opening holes 10, where a side wall of the snap-in head 23 is provided with an elastic detent ball 24 cooperating with the detent groove 11 and configured to allow the snap-in head 23 to be locked in the socket opening holes 10. When the snap-in head 23 is inserted into the socket opening holes 10, the elastic detent ball 24 is compressed downward; and when the elastic detent ball 24 moves into the detent groove 11, the elastic detent ball 24 rebounds and snaps in the detent groove 11, thereby achieving convenient installation operations. A magnet 25 is disposed on a top of the snap-in head 23 and configured to attract and hold an external hexagon screw during installation. An outer surface of the anti-slip portion 22 is provided with anti-slip knurlings, and the anti-slip knurlings are printed on the outer surface of the anti-slip portion 22 by a knurling process, and configured to provide an anti-slip effect when the extension bar 2 is removed. The hexagonal shank 20 is provided with a concave detent groove 200, the hexagonal shank 20 facilitates matching with a power tool or a pneumatic tool, and the concave detent groove 200 is configured to provide a locking function when the extension bar 2 is mounted into a power tool or a pneumatic tool.

During practical use, the difference between the dual-end switching type dual-function magnetic socket and strong-magnetic detent-ball extension bar kit and a common integral magnetic socket on the market lies in that during use, when screws of the same size are repeatedly tightened or loosened, and one socket opening becomes worn, a user may switch to the other socket opening for continuous operation, which eliminates the need for frequent replacement with a new socket; and the operation is simple, costs are effectively saved, and the service life is long. The magnet 25 is capable of attracting metal debris generated during screw tightening, and the debris may be conveniently cleaned away by pulling the extension bar 2 out from the internal hexagonal socket opening holes 10.

The above content describes the present disclosure and embodiments thereof. This description is not restrictive. The embodiment shown in the drawings represents only one of the embodiments of the present disclosure, and the actual structure is not limited thereto. In summary, any structures or embodiments designed without making inventive efforts by those of ordinary skill in the art, inspired by the present disclosure without departing from the inventive concept of the present disclosure, should fall within the protection scope of the present disclosure.

What is claimed is:

1. A single-detent-groove socket and strong-magnetic detent-ball extension bar kit, comprising a socket body;

wherein both ends of the socket body are provided with two socket openings of the same size, a socket opening hole with two regular hexagonal ends is formed in each of the socket openings, two socket opening holes that are located at the both ends of the socket body are two internal hexagonal socket opening holes and are through, a detent groove is formed in the socket body and located between the two internal hexagonal socket opening holes and also configured to switch between the two socket openings of the same size at both ends;

wherein a matching extension bar is configured to be connected with either of the internal hexagonal socket opening holes, and the matching extension bar includes a hexagonal shank configured to be mounted onto a power tool, a buffer rod disposed on the hexagonal shank, an anti-slip portion disposed on the buffer rod, and a snap-in head disposed on the anti-slip portion and configured to be cooperated with the either of the internal hexagonal socket opening holes;

wherein a side wall of the snap-in head is provided with an elastic detent ball that cooperates with the detent groove and configured to allow the snap-in head to be locked in the either of the socket opening holes, and a magnet is disposed on a top of the snap-in head and configured to attract and hold an external hexagon screw during installation; and wherein the internal hexagonal socket opening holes that are located at the both ends of the socket body are identical in size and are mutually aligned in position, and used for dual-end switching to achieve dual functions.

2. The single-detent-groove socket and strong-magnetic detent-ball extension bar kit according to claim 1, wherein an outer surface of the anti-slip portion is provided with anti-slip knurlings configured to provide an anti-slip effect when the extension bar is removed.

3. The single-detent-groove socket and strong-magnetic detent-ball extension bar kit according to claim 1, wherein outer walls at the both ends of the socket body are symmetrically provided with concave grooves, and the concave grooves are coated with paint of the same color.

4. The single-detent-groove socket and strong-magnetic detent-ball extension bar kit according to claim 1, wherein the hexagonal shank is provided with a concave detent groove configured to provide a locking function when the matching extension bar is mounted into the power tool or a pneumatic tool.

* * * * *